United States Patent

[11] 3,617,772

[72] Inventor Klaus G. Tertel
Boeblingen, Germany
[21] Appl. No. 840,172
[22] Filed July 9, 1969
[45] Patented Nov. 2, 1971
[73] Assignee International Business Machines Corporation
Armonk, N.Y.

[54] SENSE AMPLIFIER/BIT DRIVER FOR A MEMORY CELL
12 Claims, 1 Drawing Fig.

[52] U.S. Cl. 307/247, 307/238, 307/291, 340/173 R, 340/173 FF
[51] Int. Cl. G11c 7/00, H03k 17/56
[50] Field of Search 340/173; 307/247, 292, 299 A, 238, 291

[56] References Cited
UNITED STATES PATENTS

| | | | |
|---|---|---|---|
| 2,816,237 | 12/1957 | Hageman | 307/247 |
| 3,177,374 | 4/1965 | Simonian | 340/173 X |
| 3,364,362 | 1/1968 | Mellott | 340/173 X |

*Primary Examiner*—Bernard Konick
*Assistant Examiner*—Stuart Hecker
*Attorneys*—Hanifin and Jancin and James E. Murray

ABSTRACT: This specification discloses a sense amplifier/bit driver circuit for a monolithic memory storage cell using a double ended bit drive and sensing scheme. Each of the bit lines serving this storage cell is fed to the emitter of a separate transistor of the sense/drive circuit. The collectors of both these transistors are connected to opposite ends of a differential sense amplifier while the bases of transistors are connected to a diode logic circuit which controls the potential at the base. By changing the potential at the bases of the transistors, conduction through the transistors may be varied in concert or individually for reading and writing of information in the storage cells and for turning the transistors off while the storage cell is not being addressed.

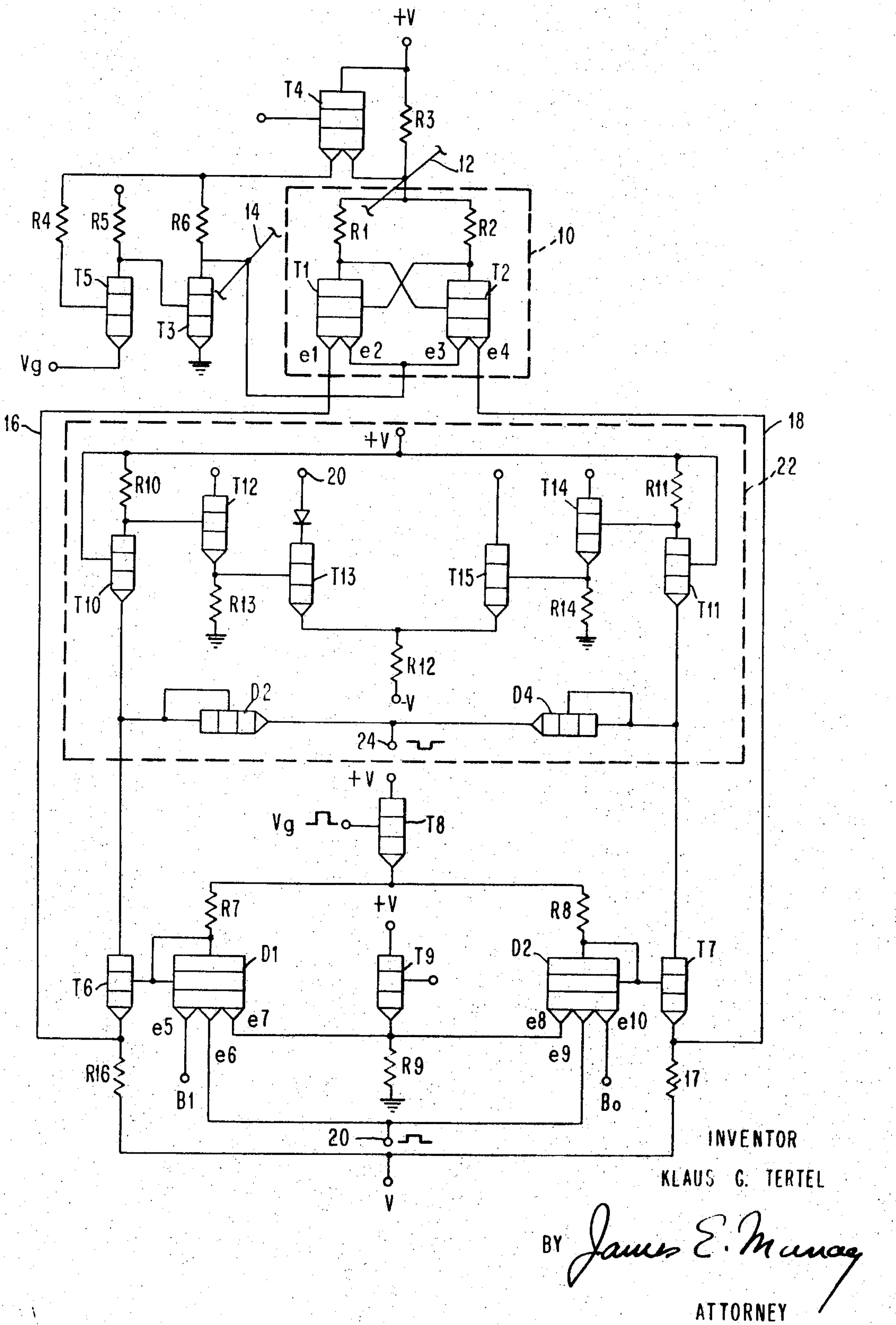
INVENTOR
KLAUS G. TERTEL
BY James E. Murray
ATTORNEY

SENSE AMPLIFIER/BIT DRIVER FOR A MEMORY CELL

BACKGROUND OF THE INVENTION

This disclosure relates to sense amplifiers and more particularly to sense amplifiers for detecting minute currents.

In U.S. Pat. No. 3,423,737, assigned to the same assignee as this application, a storage cell is described which has two double emitter transistors that have their bases and collectors cross-connected to form a bistable flip-flop. One of the emitters of each of these double emitter transistors is connected to a common word line and the other emitter of each transistor is connected to a different bit line for reading and writing data in the cell. By adjusting the potentials at these emitters it is possible to read the information stored in the cell and change the data stored in the cell. Up until now the manipulation of the control voltages and sensing of the output currents at the emitters of the storage cell which are not connected together generally required complex drive and sense circuitry which take up a significant amount of chip area when the storage cells and their support circuits are monolithically formed.

In accordance with the present invention the reading and writing functions are performed by the same circuit which performs these functions with great accuracy. In this circuit each of the uncoupled emitters of the double emitter transistor is connected by its respective bit line to the emitter of a separate transistor across a load device. The collectors of both these separate transistors are connected to opposite ends of a differential sense amplifier while the bases of the separate transistors are connected to a diode logic circuit which controls the potential at the base so as to vary the conduction through the separate transistors to perform reading and writing functions and to turn off the separate transistors while the storage cell is not being addressed.

Therefore it is an object of the present invention to provide a new sense amplifier.

It is another object of the present invention to provide a new bit driver.

It is a further object of the present invention to provide a circuit that performs both bit driving and sensing applications.

It is another object of the invention to provide bit drivers and sense amplifiers that are inexpensive and require a small amount of space on monolithic chips.

These and other objects, features and advantages of the invention will be apparent from the following more particular description of the preferred embodiment of the invention as illustrated in the accompanying FIGURE showing the bit driver/sense amplifier of the present invention coupled to a multiemitter storage cell.

Referring to the FIGURE, cross-connected double emitter transistors T1 and T2 comprise a flip-flop 10 with the resistors R1 and R2. One terminal of both the resistors R1 and R2 connect the flip-flop 10 to upper word line 12 while two of the emitters *e2* and *e3* of the transistors T1 and T2 connect the flip-flop 10 to the lower word line 14. The other emitters *e1* and *e4* of the transistors T1 and T2, respectively, connect the flip-flop 10 to the bit lines 16 and 18. So connected, flip-flop 10 can store a single bit of information in a word oriented monolithic memory. This information can be changed or determined by manipulation of the voltages on the lines 12 to 18.

While the flip-flop 10 is merely storing information, or in other words is not being addressed for reading and writing, a transistor T3, coupled between the lower word line 14 and ground, is biased conducting so that emitters *e2* and *e3* of transistors T1 and T2 are clamped to ground and as such are biased lower in potential than emitters *e1* and *e4* of the same transistors. Therefore while the cell is merely storing information, current flows through emitter *e2* or *e3* to ground. If a storage cell is storing a "0" bit of information transistor T1 is conducting so that current flows through emitter *e2* to ground and if the storage cell is storing a "1" bit of information transistor T2 is conducting so that current flows through emitter *e3* to ground. By maintaining conduction through emitter *e2* or *e3* instead of emitter *e1* or *e4* the bit lines 16 and 18 are isolated from the data stored in the cell and vice versa so that information may be written into or read from storage cells sharing the bit lines 16 and 18 without being affected by or affecting the data stored in cell 10.

It has been pointed out that transistor T3 is turning on while the storage cell is not being addressed for reading or writing. Under the same conditions, transistors T4 connecting the upper word line 12 to the +V terminal is biased off so that resistor R3 is shunt with transistor T4 carries the operating current for the flip-flop 10. Resistor R3 is selected so that the current is the minimum amount necessary to maintain bistability in the storage cell. This is done so as to reduce the power dissipated in the cell to a minimum while the information in the cell is not being read out of the cell or the data in the cell is not being changed. By reducing power dissipation from the cell to a minimum the area required by the storage cell 10 on monolithic chips may be reduced.

When data must be read from the cell or the data in the cell is to be changed more power is needed for the operation of the storage cell. Larger amounts of power permit more rapid reading and writing of data from the cell and also provide larger output pulses. For this purpose, the current through the cell is increased by shorting out resistor R3 by rendering transistor T4 conducting with an application of an up pulse to the base of transistor T4. Transistor T4 is a double emitter transistor and while conduction through one of the emitters shunts resistor R3 conduction through the other emitter supplies base drive to transistor T5. This with a simultaneous application of a gating pulse to the emitter of transistor T5 biases transistor T5 conductive causing a voltage drop across resistor R5 which biases transistor T3 off. With transistor T3 off the emitters of *e2* and *e3* of transistors T1 and T2 respectively are no longer coupled to ground through transistor T3. Instead, they are coupled to the +V voltage terminal through the conducting transistor T4 and resistor R6. This raises the potential of emitters *e2* and *e3*. By raising the potential at emitters *e2* and *e3*, current which flowed through either emitter *e2* or *e3* while the cell was not addressed will then flow through either emitter *e1* or *e4* depending on whether transistor T1 or T2 is conducting. This permits the transfer of information to and from the cell for reading and writing.

In accordance with the present invention a new circuit is provided for sensing the output of the flip-flop 10 and the emitters *e1* and *e4* when the information is being read out of the cell and for changing the potential at emitters *e1* or *e4* to change the state of the cell. For this purpose the emitter *e1* is connected to the emitter of transistor T6 and the emitter *e4* is connected to the emitter of transistor T7. The conduction of transistors T6 and T7 is controlled by the potential at cathodes or emitters *e5* through *e10* of diodes D1 and D2 which are in fact base to emitter junctions of transistors with the base and collectors shorted.

While information is not being read from the storage cell or written into the storage cell 10, emitters *e6* and *e9* are biased negatively by the potential on terminal 20 so that diodes D1 and D2 conduct sufficiently to maintain the bases of transistors T6 and T7 below the emitters of transistors T6 and T7 thereby maintaining transistors T6 and T7 off. With transistors T6 and T7 off, data cannot be transmitted through these transistors to the sense amplifier 22. Therefore, the sense amplifier 22 is isolated from the information stored in the storage cell 10.

When data is to be read from the storage cell 10 the potential at terminal 20 is raised to bias emitters *e6* and *e9* off. Likewise the potential at the B1 and B0 terminals is up biasing emitters *e5* and *e10* off. Furthermore, transistor T8 is turned on by the gating pulse V*g*. Current therefore flows from the +V source terminal through transistor T8, then in parallel through resistors R7, R8, emitters *e7* and *e8*, and then through resistor R9 to ground.

The resistors R7, R8 and R9 are selected to bias the bases of transistors T6 and T7 sufficiently positive with respect to the emitters of transistors T6 and T7 to cause transistors T6 and T7 to conduct. With transistors T6 and T7 conducting the outputs at emitters *e*1 and *e*4 are transmitted through the transistors T6 and T7 to the sense amplifier 22. For instance, assume that a "0" is stored in the storage cell, so that transistor T1 is conducting when the potential at emitter *e*2 and *e*3 is increased. Current will flow out of the *e*1 emitter and through resistor R16 connected to the emitter of transistor T6. With a "0" stored transistor T2 will not be conducting so current will not flow from emitter *e*4. This means that more current will be flowing through resistor R16 than through resistor R17 connected to the emitter of transistor T7. Thus the emitter of transistor T6 will be higher than the emitter of transistor T7 causing T6 to conduct less than T7 or actually turn off. With less current flowing through transistor T6 than T7 this means that less current will also flow through transistor T10 coupled to the collector of transistor T6 than through transistor T11 coupled to the collector of transistor T7 making the voltage drop across the resistor R10 connected to the collector of transistor T10 less than the voltage drop across collector R11 connected to the collector of transistor T11. The potential across resistor R10 drives emitter follower transistor T12 which in turn drives transistor T13. Likewise the potential across resistor R11 drives transistor T14 which in turn drives transistor T15. Transistors T13 and T15 function as a differential switch with respect to the current flowing through resistor R12. Thus if the base of transistor T13 is higher than the base of transistor T15 current will flow through transistor T13 as opposed to transistor T15. Alternatively if the base of transistor T15 is higher than the base of transistor T13 current will flow through transistor T15. Therefore in the case under discussion, when the potential across resistor R10 is less than the potential across resistor R11, it means that the potential at the base of transistor T13 or across resistor R13 will be greater than the potential at the base of transistor T15 or across resistor R14. Thus when a "0" is stored in the storage cell and transistor T1 is conducting, transistor T13 will conduct supplying a down output at the output terminal 20. Alternatively, where a "1" is stored in the storage cell and transistor T2 is conducting, transistor T13 will conduct providing an up output at the output terminal 20.

A single ended output is shown here. However, a double-ended output could be employed. Then the phase of the output signal would tell whether a "1" or a "0" is stored in the storage cell.

So far we have described how data is transmitted through the bit sense driver circuit to the differential sense amplifier and it was pointed out that transistors T6 and T7 of the bit sense drive circuit are biased conducting for sensing data in a storage cell 10 by a potential at the bases of transistors T6 and T7 determined by resistors R7, R8 and R9. The selection of relative magnitude resistors R7, R8, R9, R16 and R17 is done to minimize the effect of manufacturing tolerances and changes in temperature upon the output of the amplifier. The reduction of the effects of manufacturing tolerances accomplished by using the relative magnitudes of resistors R7, R8 and R9 to determine the potential at the bases of transistors T6 and T7 as opposed to the use of absolute values of resistors for this purpose. Thus the potential at the base of transistor T6 is determined by the relative magnitude of resistors R7 and R9 while the potential at the base of transistor T7 is determined by the relative magnitudes of resistors R8 and R9. Because the potential is determined by these proportions it means that they can be more easily fabricated, since relative proportions of circuit elements are easy to hold within tolerances in monolithic circuits than the absolute values of the elements. Furthermore, since a diode D1 or D2 makes up a portion of the total impedance the advantage of diode tracking is gained where the base to emitter junctions of T6 and T7 are tracked by the diodes D1 and D2 so as to compensate for temperature variations and manufacturing variations. The values of resistors R7, R8, R9, R16 and R17 are selected to make the potential at *e*7 and *e*8 equal to the potentials at the emitters of transistors T6 and T7.

So far we have been discussing how to read data in the storage cell 10. To write data into the storage cell the potential of *e*1 or *e*4 is raised along with the potential of *e*2 and *e*3. This is accomplished by rendering one of the transistors T6 or T7 more conductive than the other. For instance, to write a "1" into the storage cell 10, transistor T9 is rendered conductive to bias emitters *e*7 and *e*8 at a higher potential than the base of transistors T6 and T7. This cuts off conduction through emitters *e*7 and *e*8. Simultaneously, potential of B1 is held at a high enough potential to prevent conduction through emitter *e*5 so that diode D1 does not conduct at all and B0 is lowered sufficiently to cause conduction of diode D2 through emitter *e*10. Conduction through emitter 10 maintains the potential at the )emitter *e*4 of transistor T2 at its read level while hard conduction through transistor T6, as a result of all the current flowing through resistor R7 driving transistor T6, raises the emitter *e*1 of transistor T1 to the level of emitters *e*2 and *e*3. Therefore at write "1" time emitters *e*1, *e*2 and *e*3 are all up while emitter *e*4 is at a lower potential causing conduction through emitter *e*4. When the potential at emitters *e*1, *e*2 and *e*3 are reduced to their storage values after write time, transistor T2 will still conduct thus storing a "1" in the storage cell.

A "0" is written into the storage cell in the same manner except the potential at terminal B0 is increased to bias diode D2 off while terminal B1 is biased to cause conduction of diode D1 through emitter *e*5 thereby maintaining emitters *e*2, *e*3 and *e*4 at a higher potential than emitter *e*1. While both the "0" and "1" write operations are being performed, the potential at terminal 24 is lowered to cause diodes D3 and D4 to conduct. This isolates the sense amplifier 22 from the writing signals.

Therefore, while the invention has been particularly shown and described with reference to a preferred embodiment thereof, it will be understood by those skilled in the art that various changes in form and details may be made therein without departing from the spirit and scope of the invention.

What is claimed is:

1. A circuit for sensing output signals from a memory storage cell when the data in the cell is to be read and for the application of drive signals to the cell when data is to be written into the cell comprising:

a. input means for the receipt of signals to be sensed from the storage cell and the transmissions of drive signals to the cell;

b. output means for the transmission of the data from the sensed signals;

c. a transistor with an emitter connected to the input means and a collector connected to the output means for the detection of data in the signals to be sensed during the reading of information stored in the cell and for the generation of drive pulses during writing of information into the cell;

d. load means coupled to the emitter for generation of potentials due to current from signals received by the input means and from the transistor; and e. base biasing means coupled to the base of the transistor for varying the potential at the base to operate the transistor as a detector while signals are to be sensed and as a driver when data is to be written into the storage cell wherein said base biasing means includes:

i. diode means with characteristics matching the base to emitter characteristics of the transistor, said diode having an anode connected to the base of the transistor;

ii. a source of potential;

iii. a first load means coupling the anode of the diode to one terminal of the source of potential; and iv a second load means coupling a cathode of the diode to the other terminal of the source of potential whereby the potential supplied to the base of the transistor is determined by the relative magnitudes of the first and second load means.

2. The circuit of claim 1 wherein said diode means has a multiplicity of cathodes.

3. The circuit of claim 2 including:

a. means for backbiasing the first mentioned cathode of said diode; and b. a second of said cathodes which can be selectively forward or back biased to vary the potential at the emitter of the transistor for writing information into said cell.

4. The circuit of claim 2 including terminal means coupled to a third of said cathodes for the reception of signals to backbias said transistor.

5. The circuit of claim 1 wherein said output means is a sense amplifier.

6. The circuit of claim 1 wherein said load means is a resistor.

7. The circuit of claim 1 wherein said input means is a memory bit line.

8. A circuit for sensing output signals from each end of a double ended memory storage cell when the data in the cell is to be read and for the application of drive signals to that cell when data is to be written into the cell comprising:

a. input means from each end of the storage cell for the receipt of signals to be sensed from the storage cell and the transmission of drive signals to the cell;

b. output means for the transmission of the data from the sensed signals;

c. two transistors each with an emitter connected to one of the input means and a collector connected to the output means for the detection of data in the sensed signals during the reading of information stored in the cell and for the generation of drive pulses during writing of information into the cell;

d. load means coupled to each emitter for generation of potentials due to current from signals received by the input means and from the transistors; and e. base biasing means coupled to the base of each of the transistors for varying the potential at the base to operate the transistors as detectors while signals are to be sensed and as drivers when data is to be written into the storage cell wherein each of said base biasing means includes:

i. diode means with characteristics matching the base to emitter characteristics of the transistors, said diode means having an anode connected to the base of a separate one of the transistors;

ii. a source of potential;

iii. a first load means for coupling the anode of the diode to one terminal of the source of potential; and iv. a second load means coupling a cathode of the diode to the other terminal of the source of potential whereby the potential supplied to the base of each of the transistors is determined by the relative magnitudes of the first and second load means.

9. The circuit of claim 8 wherein each said diode means has a multiplicity of cathodes.

10. The circuit of claim 9 including:

a. means for backbiasing the first mentioned cathode of each of said diodes; and b. a second of said cathodes of each of said diodes which can be selectively forward or back biased to vary the potential at the emitter of each of the transistors individually for writing information into said cell.

11. The circuit of claim 8 wherein said output means is a differential sense amplifier.

12. The circuit of claim 8 wherein said load means is a resistor.

* * * * *